United States Patent
Dall'Aglio et al.

(10) Patent No.: US 7,690,127 B2
(45) Date of Patent: Apr. 6, 2010

(54) APPARATUS FOR THE DIMENSIONAL CHECKING OF AN ORBITALLY ROTATING CRANKPIN OF A CRANKSHAFT

(75) Inventors: Carlo Dall'Aglio, Castello D'Argile (IT); William Montanari, Castel Maggiore (IT)

(73) Assignee: Marposs, S.p.A., Bentivoglio (BO) (IT)

( * ) Notice: Subject to any disclaimer, the term of this patent is extended or adjusted under 35 U.S.C. 154(b) by 39 days.

(21) Appl. No.: 12/268,248

(22) Filed: Nov. 10, 2008

(65) Prior Publication Data

US 2009/0113736 A1 May 7, 2009

Related U.S. Application Data

(63) Continuation of application No. 12/000,269, filed on Dec. 11, 2007, now Pat. No. 7,464,482, which is a continuation of application No. 11/346,269, filed on Feb. 3, 2006, now Pat. No. 7,325,324, which is a continuation of application No. 11/014,955, filed on Dec. 20, 2004, now Pat. No. 7,024,785, which is a continuation of application No. 10/657,086, filed on Sep. 9, 2003, now Pat. No. 6,848,190, which is a continuation of application No. 10/187,834, filed on Jul. 3, 2002, now Pat. No. 6,643,943, which is a continuation of application No. 09/678,379, filed on Oct. 3, 2000, now Pat. No. 6,430,832.

(30) Foreign Application Priority Data

Jan. 18, 2000 (IT) .............................. BO00A0012

(51) Int. Cl.
*G01B 3/38* (2006.01)

(52) U.S. Cl. ....................................... 33/555.3; 33/550

(58) Field of Classification Search .................... 33/549, 33/550, 551, 555, 555.1, 555.3
See application file for complete search history.

(56) References Cited

U.S. PATENT DOCUMENTS 1,941,456 A    1/1934   Arnold
2,603,043 A    7/1952   Bontemps (Continued)

FOREIGN PATENT DOCUMENTS

EP         0 469 439 A1    2/1992

(Continued)

*Primary Examiner*—G. Bradley Bennett
(74) *Attorney, Agent, or Firm*—Dickstein Shapiro LLP

(57) ABSTRACT

An apparatus for checking the diameter of crankpins of a crankshaft in the course of the machining in a grinding machine includes a Vee-shaped reference device, a measuring device associated with the reference device and including a feeler axially movable along the bisecting line of the Vee-shaped reference device, and a support device with a first arm rotating with respect to a support arranged on the grinding-wheel slide and a second arm rotating with respect to the first and carrying the Vee-shaped reference device.

A guiding mechanism includes a limiting device, with mutually abutting surfaces and coupled to the support device, that guides the displacement of the reference device along a trajectory substantially parallel to the profile of the grinding wheel, allows the engagement of the reference device on a crankpin to be checked while the latter is orbitally moving, and does not interfere with the displacements of the support device caused by the orbital motion of the crankpin in the checking condition.

5 Claims, 6 Drawing Sheets

U.S. PATENT DOCUMENTS

| | | | |
|---|---|---|---|
| 3,802,087 A | 4/1974 | Raiteri | |
| 3,987,552 A | 10/1976 | Raiteri | |
| 4,637,144 A | 1/1987 | Schemel | |
| 5,086,569 A | 2/1992 | Possati et al. | |
| 5,088,207 A | 2/1992 | Betsill et al. | |
| 5,097,602 A | 3/1992 | Cross et al. | |
| 5,123,173 A | 6/1992 | Possati | |
| 5,150,545 A | 9/1992 | Esteve | |
| 5,337,485 A | 8/1994 | Chien | |
| 5,419,056 A | 5/1995 | Breitenstein | |
| 5,542,188 A | 8/1996 | Ertl et al. | |
| 5,551,906 A | 9/1996 | Helgren | |
| 5,758,431 A | 6/1998 | Golinelli | |
| 5,761,821 A | 6/1998 | Laycock | |
| 5,919,081 A | 7/1999 | Hykes et al. | |
| 6,062,948 A | 5/2000 | Schiff et al. | |
| 6,067,721 A | 5/2000 | Dall'Aglio et al. | |
| 6,088,924 A | 7/2000 | Esteve | |
| 6,159,074 A | 12/2000 | Kube et al. | |
| 6,256,898 B1 | 7/2001 | Trionfetti | |
| 6,298,571 B1 | 10/2001 | Dall'Aglio et al. | |
| 6,430,832 B1 | 8/2002 | Dall'Aglio et al. | |
| 6,568,096 B1 | 5/2003 | Svitkin et al. | |
| 6,643,943 B2 | 11/2003 | Dall'Aglio et al. | |
| 6,848,190 B2 | 2/2005 | Dall'Aglio et al. | |
| 6,952,884 B2 * | 10/2005 | Danielli | 33/555.1 |
| 7,024,785 B2 | 4/2006 | Dall'Aglio et al. | |
| 7,464,482 B2 * | 12/2008 | Dall'Aglio et al. | 33/555.3 |
| 2004/0055172 A1 | 3/2004 | Danielli | |
| 2008/0163509 A1 | 7/2008 | Kube et al. | |

FOREIGN PATENT DOCUMENTS

| | | |
|---|---|---|
| EP | 0 903 199 A2 | 3/1999 |
| GB | 2 161 101 A | 1/1986 |
| GB | 2 300 582 A | 11/1996 |
| WO | WO 97/12724 | 4/1997 |
| WO | WO 97/13614 | 4/1997 |

* cited by examiner

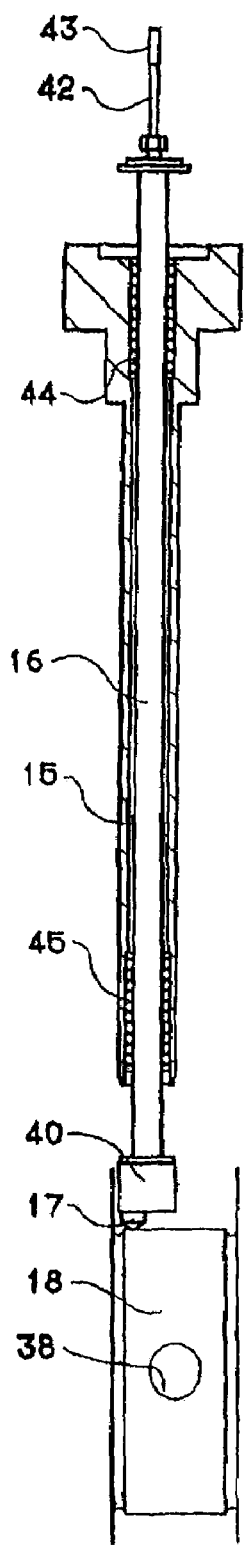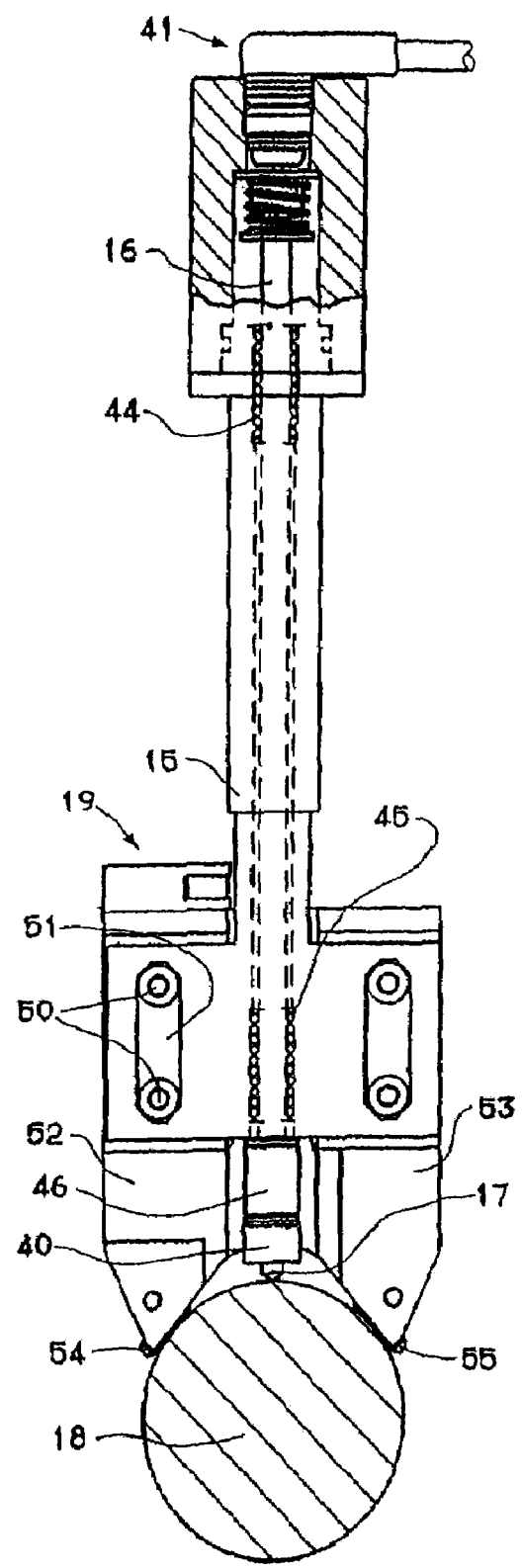
FIG. 6
FIG. 7

US 7,690,127 B2

APPARATUS FOR THE DIMENSIONAL CHECKING OF AN ORBITALLY ROTATING CRANKPIN OF A CRANKSHAFT

This is a continuation of U.S. patent application Ser. No. 12/000,269, filed Dec. 11, 2007 now U.S Pat. No. 7,464,482, which is a continuation of U.S. patent application Ser. No. 11/346,269, filed Feb. 3, 2006, now U.S. Pat. No. 7,325,324, which is a continuation of U.S. patent application Ser. No. 11/014,955, filed on Dec. 20, 2004, now U.S. Pat. No. 7,024,785, which is a continuation of U.S. patent application Ser. No. 10/657,086, filed on Sep. 9, 2003, now U.S. Pat. No. 6,848,190, which is a continuation of U.S. patent application Ser. No. 10/187,834, filed on Jul. 3, 2002, now U.S. Pat. No. 6,643,943, which is a continuation of U.S. patent application Ser. No. 09/678,379, filed on Oct. 3, 2000, now U.S. Pat. No. 6,430,832, the entire disclosures of which are incorporated herein by reference.

BACKGROUND OF THE INVENTION

1. Field of the Invention

The present invention relates to an apparatus for checking the diameter of a cylindrical part, rotating about a geometrical axis, e.g. an orbitally rotating crankpin, in the course of the machining in a numerical control grinding machine including a grinding-wheel slide, with a reference device for cooperating with the part to be checked, a measuring device movable with the reference device, a support device for supporting the reference device and the measuring device, the support device having a support element adapted to be fixed to the grinding-wheel slide, a first coupling element coupled to the support element so as to rotate about a first axis of rotation, and a second coupling element carrying the reference device and coupled to the first coupling element so as to rotate with respect to it about a second axis of rotation parallel to the first axis of rotation, a control device for controlling automatic displacements of the apparatus from a rest position to a checking condition, in the course of such displacements the reference device performing closing movements with respect to the support element, and a guiding mechanism associated with the reference device for guiding the arrangement of the latter on the cylindrical part towards the checking condition of the apparatus.

2. Description of the Related Art

Apparatuses with these characteristics, for the diameter checking of crankpins rotating with orbital motion about a geometrical axis, are disclosed in U.S. Pat. No. 6,067,721, assigned to the same assignee of this patent application. In particular, according to the embodiments shown and described in the above mentioned U.S. patent, the apparatuses have Vee-shaped reference devices that rest on the crankpin to be checked, and guide means associated with said Vee-shaped reference devices, for example with elements with suitably shaped surfaces for entering into engagement with the crankpin.

The embodiments shown in U.S. Pat. No. 6,067,721 guarantee excellent metrological results and small forces of inertia, and the standards of performance of the apparatuses with these characteristics, manufactured by the assignee of the present patent application, confirm the remarkable quality and the reliability of the applications.

However, in some cases there can be problems owing to the limited space available on the machine tool for mounting the checking apparatus including the guide elements that have surfaces with appropriate extension for guaranteeing the correct cooperation with the crankpin to be checked.

SUMMARY OF THE INVENTION

Object of the present invention is to provide an apparatus for the metrological checking of crankpins rotating in the course of the machining in a machine tool, for example during the in-process checking in a grinding machine for grinding crankpins rotating with an orbital motion, that can guarantee the same standards of performance, in terms of accuracy and reliability, as those of the apparatuses according to the above mentioned U.S. patent and offers small layout dimensions with respect to those apparatuses.

This problem is solved by a checking apparatus of the hereinbefore mentioned type, wherein the guiding mechanism includes a limiting device with at least a pair of abutting surfaces adapted to engage with each other and limit the closing movements of the reference device during the automatic displacements towards the checking condition, and to disengage from each other further to the arrangement of the reference device on the cylindrical part to be checked.

An advantage that the present invention provides is that, by virtue of the presence of the limiting device, the reference device is prevented from colliding against the grinding wheel in the event the apparatus is accidentally controlled to displace towards the checking condition and there is no crankpin on the worktable.

BRIEF DESCRIPTION OF THE DRAWINGS

The invention is now described in more detail with reference to the enclosed drawings, showing a preferred embodiment by way of illustration and not of limitation. In said drawings:

FIG. 6 shows a detail of the measuring device of an apparatus according to the present invention for the comparative measurement of the diameter of a crankpin, that avoids interferences with the lublication hole in the crankpin; and FIG. 7 is a partially cross-sectional view of the measuring system of the apparatus.

DESCRIPTION OF PREFERRED EMBODIMENTS

Figure 1:
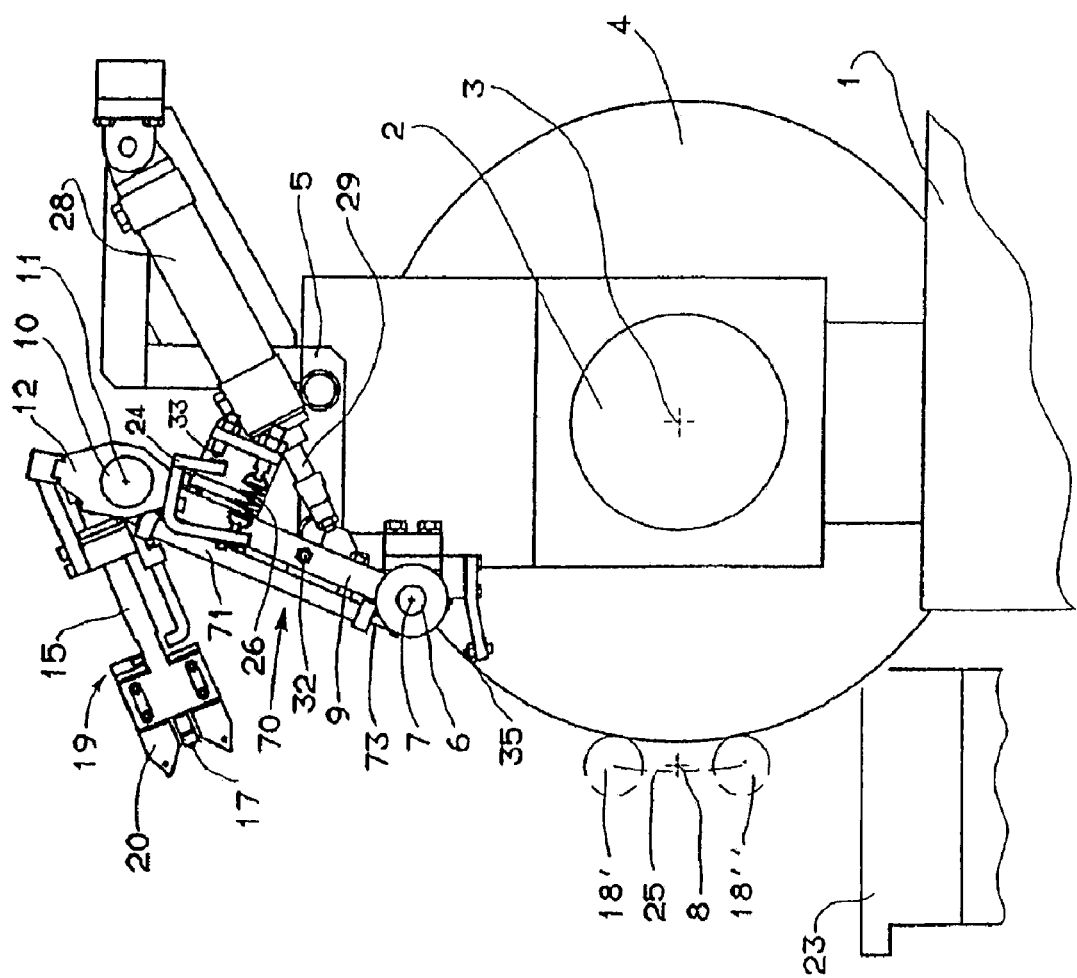
FIG. 1 is a lateral view of a measuring apparatus mounted on the grinding-wheel slide of a grinding machine for crankshafts, shown in a rest position.

With reference to FIGS. 1 to 5, the grinding-wheel slide 1 of a computer numerical control ("CNC") grinding machine for grinding crankshafts supports a spindle 2 that defines the axis of rotation 3 of grinding wheel 4. The grinding-wheel slide 1 carries a support device including a support element 5 that, by means of a rotation pin 6, with preloaded bearings—not shown—, supports a first rotating, coupling element 9. Pin 6 defines a first axis of rotation 7 parallel to the axis of rotation 3 of grinding wheel 4 and to the axis of rotation 8 of the crankshaft. In turn, coupling element 9, by means of a rotation pin 10, with preloaded bearings—not shown—, defining a second axis of rotation 11 parallel to the axes of rotation 3 and 8, supports a second rotating, coupling element 12. At the free end of coupling element 12 there is coupled a guide casing 15 wherein there can axially translate a transmission rod 16 carrying a feeler 17 for contacting the surface of crankpin 18 to be checked. The displacements of rod 16 are detected by a measuring device, as hereinafter disclosed. At the lower end of the guide casing 15 there is fixed a support block 19 supporting a reference device 20, Vee-shaped, adapted for engaging the surface of crankpin 18 to be checked, by virtue of the rotations allowed by pins 6 and 10. The transmission rod 16 is movable along the bisecting line of the Vee-shaped reference device 20.

Figure 5:
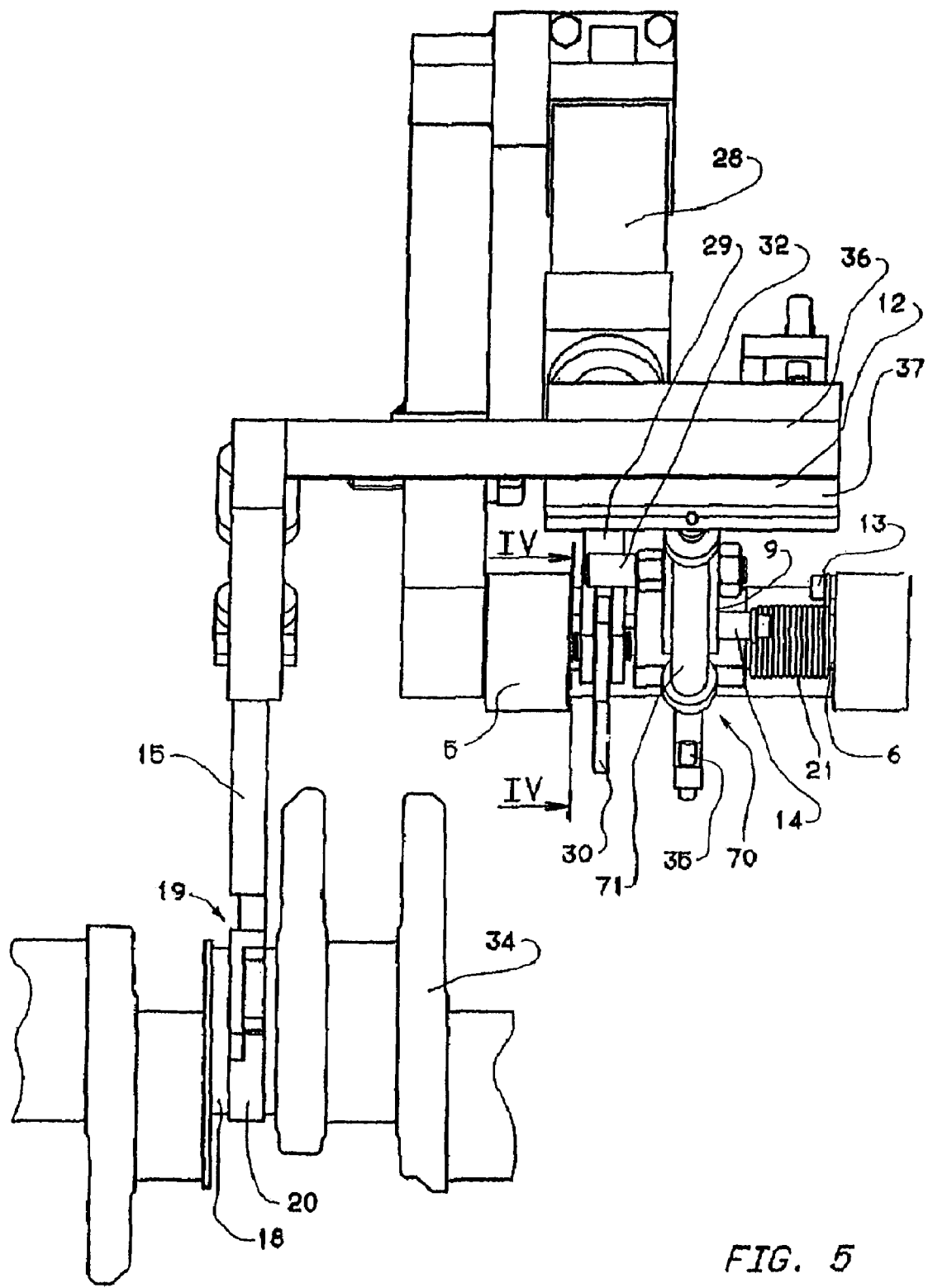
FIG. 5 is a partial, front view of the apparatus of FIG. 3 mounted on the grinding-wheel slide of the grinding machine.

A balance spring 21, more specifically a helical torsional spring, shown in FIG. 5, is arranged between support element 5 and the first rotating element 9. The spring 21, that has substantially cylindrical extension, is arranged about pin 6 and has its ends coupled to pins 13 and 14 integral to support element 5 and to the first rotating, coupling element 9, respectively. The spring 21 applies a force that tends to cause the rotation of the first coupling element 9 with respect to the support element 5 in a clockwise direction (with reference to FIGS. 1-3), and to counterbalance the weight of the apparatus in a checking condition, as hereinafter described.

A guiding mechanism that, according to the following more detailed description, has the function of guiding reference device 20 to engage crankpin 18, includes a limiting device 70 located between the grinding-wheel slide 1 and the second coupling element 12, for limiting and guiding the movements of the first coupling element 9 and the second coupling element 12 during their rotations about the axes of rotation 7 and 11 defined by pins 6 and 10.

Figure 2:
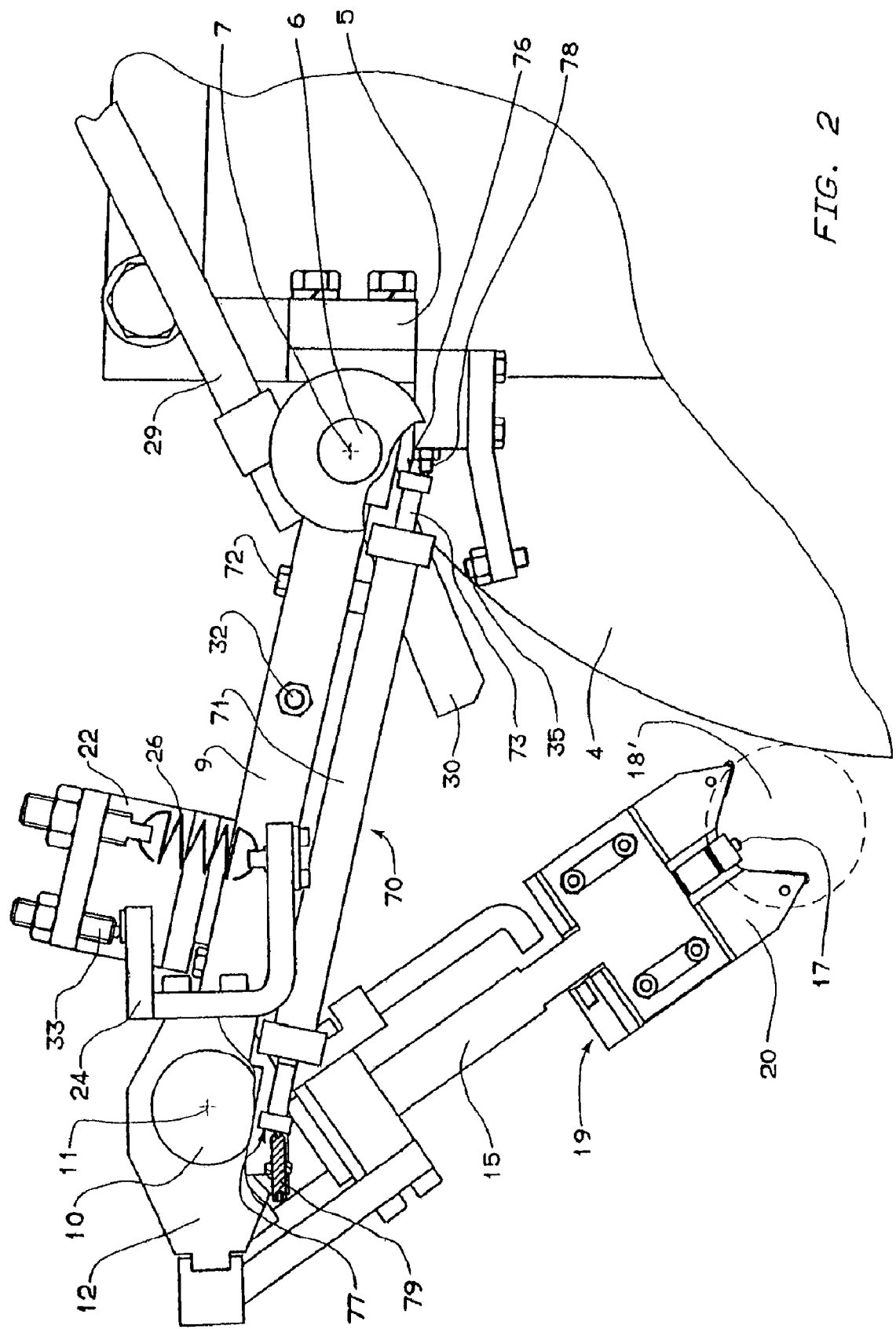
FIGS. 2 and 3 are partial, lateral views, shown in an enlarged scale and with some details cross-sectioned, of the apparatus of FIG. 1, under a different operating condition.
Figure 3:
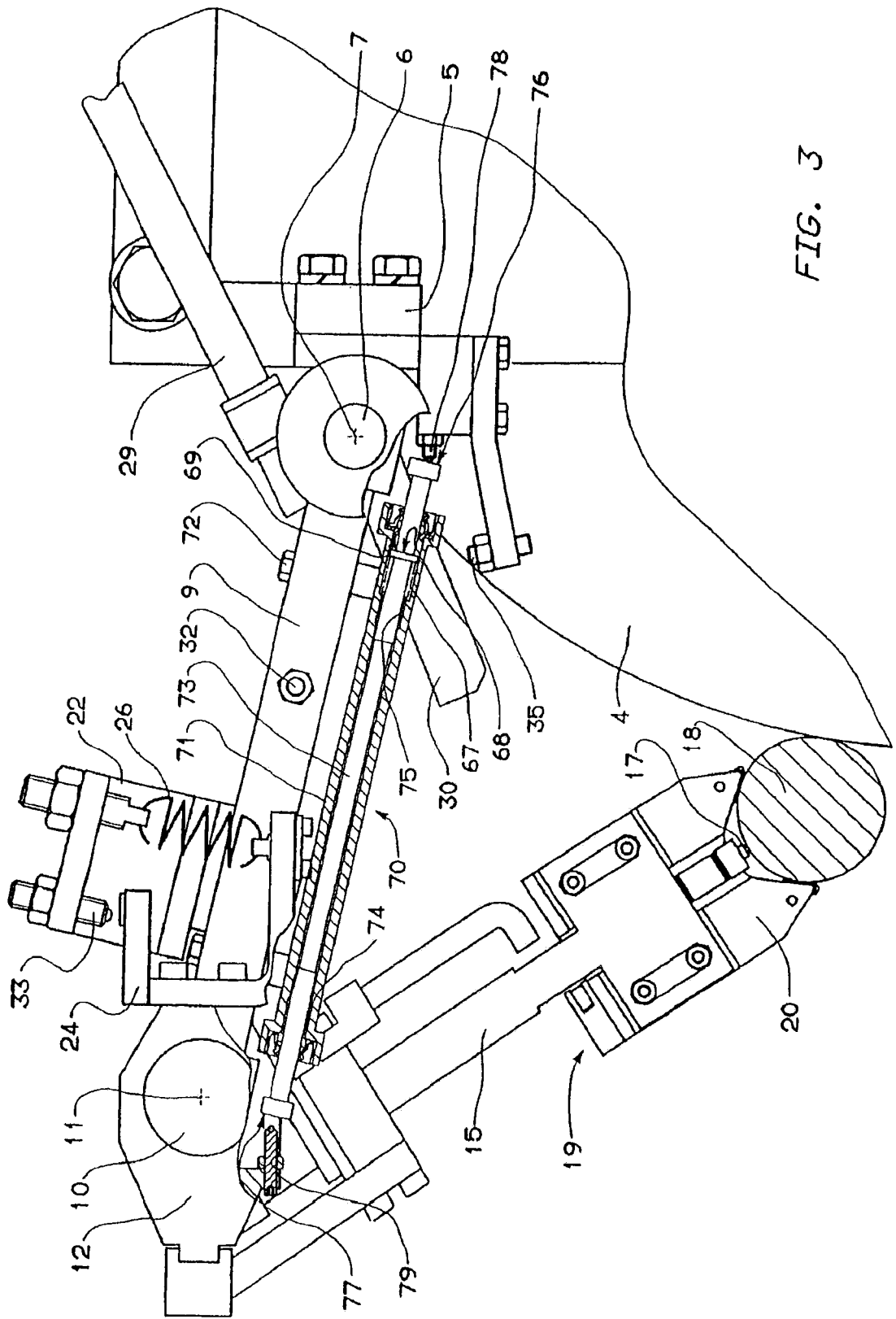

The limiting device 70 includes bearing and guiding elements with a tubular element 71 fixed to the first coupling element 9 by means of screws 72 and arranged parallel to said element 9, and a rigid elongate element or stem 73, housed at the interior of tubular element 71 and guided to perform axial translations by two bushings 74 and 75 arranged at the interior of the tubular element 71 and illustrated in FIG. 3. Internal abutting surfaces 68 and 69 limit the entity of the axial translations between stem 73 and tubular element 71 and a compression spring 67 keeps the surfaces 68 and 69 one against the other when there are no external stresses. The ends of stem 73 have a first mechanical abutting surface 76 and a second mechanical abutting surface 77 (illustrated in FIGS. 2 and 3), that are substantially plane and perpendicular with respect to the axis of stem 73. Furthermore, limiting device 70 includes a first reference abutment element with a pin 78 coupled in an adjustable way to the support element 5 (and consequently to grinding-wheel slide 1), and a second reference abutment element with a pin 79 coupled in an adjustable way to the second coupling element 12 (and consequently to reference device 20). The pins 78 and 79 define convex, in particular spherical, abutting surfaces. A different embodiment of the invention can include abutting surfaces 76, 77, 78 and 79 having different geometrical shapes.

A return closing spring 26 is coupled between blocks 22 and 24, that are fixed, respectively, to the first (9) and to the second (12) rotating, coupling elements in the vicinity of the rotation pin 10. An adjustable positive stop element 33, also coupled to block 22, is urged by spring 26 against an abutting surface of block 24 for achieving a device for limiting the angular position between the first (9) and the second (12) coupling elements and the associated reciprocal rotation displacements.

An additional fixed abutment element 35 is rigidly coupled to support element 5 and intended for cooperating with the external surface of tubular element 71 for limiting the rotations in a counterclockwise direction (with reference to FIGS. 1-3) of the first coupling element 9 about axis 7.

The crankshaft to be checked is positioned on the worktable 23, between a spindle and a tailstock, not shown, that define the axis of rotation 8, coincident with the main geometrical axis of the crankshaft. As a consequence, crankpin 18 performs an orbital motion about axis 8. Reference number 18' indicates the upper position that the crankpin reaches, whereas reference number 18" indicates the crankpin lower position. Even though crankpin 18 rotates eccentrically about axis 8, by describing a circular trajectory, the trajectory of the pin with respect to the grinding-wheel slide 1 can be represented, substantially, by the arc shown with a dashed line and indicated by reference number 25. Thus, when reference device 20 rests on crankpin 18, it describes a similar trajectory, with a reciprocating motion from up to down and vice versa and at a frequency—of some tens of revolutions per minute—equal to that of the orbital motion of crankpin 18. This is due to the fact that the checking apparatus is carried by the grinding-wheel slide 1 that, in modern numerical control grinding machines, machines the crankpins while they rotate in an orbital motion, by "tracking" the pins so as to keep the grinding wheel in contact with the surface to be ground. Obviously, there is added, to the transversal "tracking" motion, a feed motion for the stock removal. Thus, it is understood that the displacements of the elements forming the checking apparatus involve relatively small forces of inertia, to the advantage of the metrological performance, limited wear and reliability of the apparatus.

Figure 4:
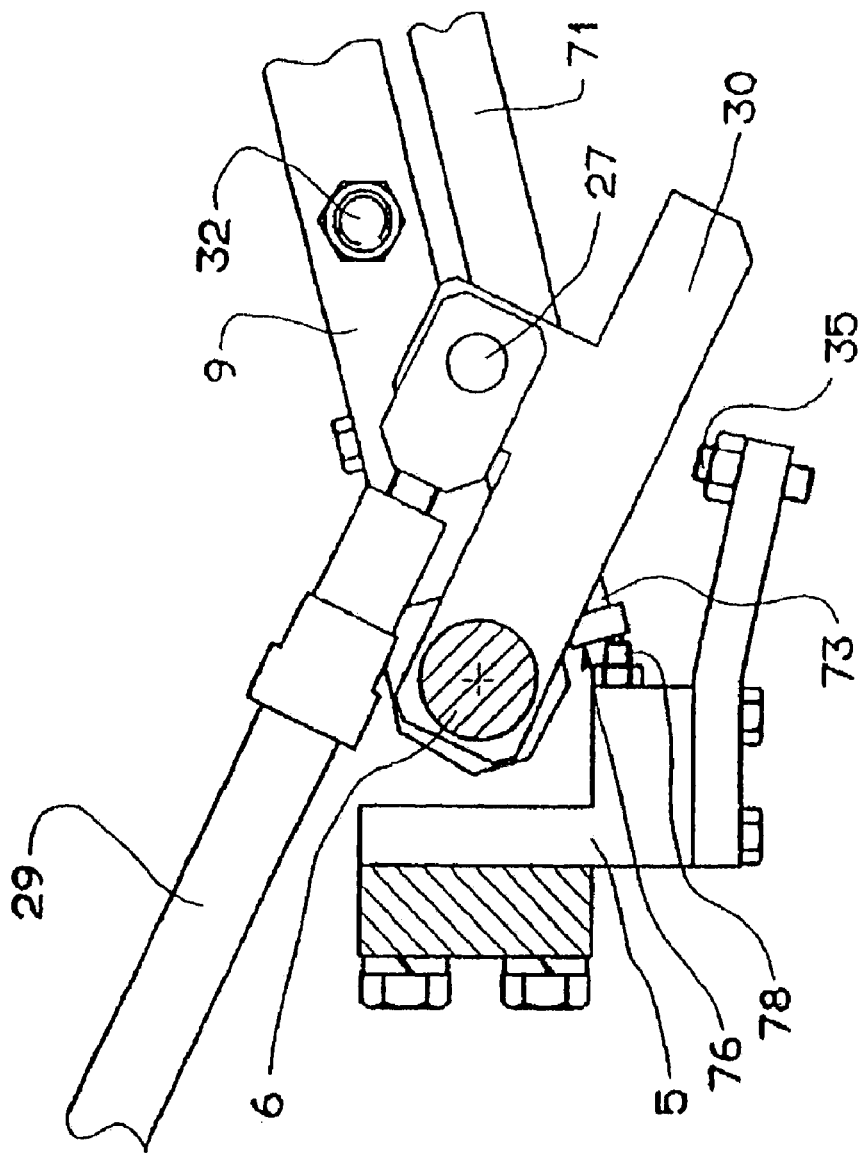
FIG. 4 is a partial, lateral view of some components of the apparatus shown in FIG. 3, taken along the line IV-IV of FIG. 5.

A control device, with some details shown in FIGS. 4 and 5, includes a double-acting cylinder 28, for example of the hydraulic type. Cylinder 28 is supported by grinding-wheel slide 1 and comprises a movable element, in particular a rod 29, coupled at one end to the piston of cylinder 28, and at the other, by means of a rotation pin 27, at an intermediate portion of a movable element, more specifically a lever 30, the latter being in turn connected to an end, and by means of rotation pin 6, to support element 5. When cylinder 28 is activated for displacing the piston and retracting rod 29 to the left (with reference to FIG. 4), lever 30 rotates in a counterclockwise direction (with reference to FIG. 4) about pin 6, and the free end of lever 30 contacts a hooking element or pin 32 fixed to the first coupling element 9, causing the latter to rotate in a counterclockwise direction (FIG. 4) and the checking apparatus to displace to the rest position shown in FIG. 1. During this displacement, the abutting surface of block 24 enters into contact, urged by spring 26, with the positive stop element 33, thus defining a minimum value of the angle formed between the two coupling elements 9 and 12. The retraction of the checking apparatus to the rest position is normally controlled by the grinding machine numerical control when, on the ground of the measuring signal of the checking apparatus, it is detected that crankpin 18 has reached the required (diametral) dimension. Thereafter, the machining of other parts of the crankshaft takes place, or—in the event the machining of the crankshaft has been completed—the piece is unloaded, manually or automatically, and a new piece is loaded on worktable 23.

When a new crankpin has to be machined, it is brought in front of grinding wheel 4, usually by displacing worktable 23 (in the case of a grinding machine with a single grinding wheel), and the apparatus moves to the checking condition. This occurs by controlling, by means of the grinding machine numerical control, cylinder 28 so that rod 29 is displaced to the right (with reference to FIG. 4). Thus, the free end of lever 30 (that rotates in a clockwise direction—in FIG. 4—about rotation pin 6) disengages from hooking pin 32 and support block 19, through rotations of the coupling elements 9, 12, due to the specific weight of the components of the checking apparatus, approaches crankpin 18, that in the meanwhile moves according to its orbital trajectory. More specifically, in a first phase of the displacement the coupling elements 9 and 12 integrally rotate about rotation axis 6 because spring 26 keeps the positive stop element 33 in abutment against the surface of block 24. In this phase the position of stem 73 in tubular element 71 is defined by the resting of the internal abutting surfaces 68 and 69 urged against each other by the thrust of compression spring 67. After a rotation of a specific entity, and while support block 19 and reference device 20 perform closing movements with respect to the support element 5 approaching both orbitally moving pin 18 and grinding wheel 4, the first mechanical abutting surface 76 of stem 73 touches pin 78 and, after a further short travel, a surface of the Vee-shaped reference device 20 engages crankpin 18 or does not. In the first case, further to the full resting of device 20 on crankpin 18, the positive stop element 33 detaches from the surface of block 24 and the correct cooperation between crankpin 18 and reference device 20 is maintained in the course of the checking phase by virtue of the displacements of coupling elements 9 and 12 caused by the force of gravity and by the thrust of crankpin 18, in opposition to the force of gravity applied to the elements of the checking apparatus. The dimensions and structure of the apparatus may be designed in such a way that, for example, each of the sides of the Vee of the reference device 20 applies to crankpin 18 a force, due to gravity, of about one kilogram.

If, on the contrary, in the course of the above-mentioned closing movements and after contact has occurred between the first mechanical abutting surface 76 of stem 73 and pin 78, the surface of the Vee-shaped reference device 20 does not engage crankpin 18 (and, in some cases, the dimensions of the apparatus can be such that, in the first phase of the displacement, the Vee-shaped reference device 20 cannot engage crankpin 18), after a further short travel the second end surface 77 of stem 73 touches pin 79. At this point (FIG. 2), in a second phase of the displacement, the positive stop element 33 disengages from the surface of block 24 and, while the first coupling element 9 continues to rotate about axis 7, the second coupling element 12 rotates with respect to the first 9 about the second axis of rotation 11, and support block 19 displaces along a trajectory that is substantially parallel to the profile of grinding wheel 4. This displacement is due to the fact that, in this second phase of the displacement, the contact points between the plane end surfaces 76 and 77 and abutment pins 78 and 79 (the position of these points varies as a consequence of the sliding of the abutment pins 78 and 79 on surfaces 76 and 77) define instantaneous axes of rotation parallel to axes 7 and 11. In other words, the first (9) and the second (12) coupling elements, support element 5 and stem 73 define a substantially parallelogram-shaped structure in which the distance separating two axes of rotation with respect to the other two slightly varies in the course of the displacement. During this displacement, the Vee-shaped reference device 20 is guided towards crankpin 18 and can come into contact with it in any whatsoever point of its orbital trajectory.

The apparatus dimensions are such that contact between crankpin 18 and the Vee-shaped device 20 cause the immediate disengagement of one of the two pairs of mechanical abutting surfaces defined by ends 76 and 77 of stem 73 and abutment pins 78 and 79. FIG. 2, that refers to a condition in which both plane end surfaces 76 and 77 of stem 73 have contacted the respective abutment pins 78 and 79, shows the position of the Vee-shaped device 20 with respect to the upper position 18' that crankpin 18 reaches in the course of its displacement. It is obvious that crankpin 18 first meets the side of the Vee farthest from grinding wheel 4, and device 20 adapts its position on crankpin 18 thanks to a limited rotation of support block 19 (in a counterclockwise direction with reference to FIG. 2), and this rotation causes the disengagement of the plane end surface 77 of stem 73 and pin 79. Hence, it is possible to keep the correct cooperation between crankpin 18 and reference device 20 in the course of the checking phase, as previously mentioned, by virtue of the displacements of coupling elements 9 and 12, caused by the force of gravity and by the thrust of crankpin 18, in opposition to the force of gravity acting on the elements of the checking apparatus. Thus, limiting device 70 does not interfere, during the checking phase, with the free displacing of the coupling elements 9 and 12.

Thus, the presence of limiting device 70 enables to achieve a guided displacement of the Vee-shaped reference device 20 towards crankpin 18 to be checked, and this displacement guarantees the dynamic engagement of the former on the latter in a correct checking condition. Limiting device 70, that starts operating only at a certain point of the automatic displacement controlled by cylinder 28, and only if necessary (in other terms if the correct engagement of the Vee-shaped device 20 on crankpin 18 in the meantime has not occurred), limits the closing movements of reference device 20 during which the latter approaches towards grinding wheel 4, guiding its displacements along a trajectory that is substantially parallel to the profile of grinding wheel 4. The displacements guided along such trajectory take place until there is achieved the correct cooperation between Vee-shaped device 20 and crankpin 18.

Thus, even in the event that owing to an error there is no crankshaft 34 positioned in the checking position on worktable 23, and reference device 20 does not find any crankpin 18 on which rest, limiting device 70 prevents device 20 from colliding against grinding wheel 4, and causing imaginable negative consequences. On the other hand, as previously mentioned, by virtue of the disengagement of the surfaces of the pair of mechanical abutting surfaces 77 and 79 at the appropriate moment in time, limiting device 70 does not limit in any way the free displacement of the coupling elements 9 and 12 in the course of the checking phase, thereby guaranteeing, during that phase, the correct cooperation between the Vee-shaped device 20 (and the components of the measuring device, coupled thereto) and orbiting crankpin 18 to be checked.

In some cases, the forward displacement of rod 29 may be controlled so that the approaching movement of support block 19 be temporarily stopped in correspondence to a position close to the trajectory 25, but slightly apart from the upper position 18' of crankpin 18. The full extension of rod 29 is then controlled by the grinding machine numerical control when crankpin 18 is going to reach its upper position 18', so that the crankpin 18 dynamically engages reference device 20 substantially at such upper position 18'. This way of proceeding allows to have a low mutual speed between the parts that come into engagement with each other (reference device 20 and crankpin 18), so providing a very soft impact between them.

Obviously, even the phase of displacement of the apparatus towards the rest position, controlled by activating cylinder 28 for causing the retraction of rod 29, as previously described, can include two phases, as the displacement towards to the checking condition.

More particularly, depending on the position in which there takes place the disengagement between the Vee-shaped device 20 and the surface of pin 18, it may occur that, further to this disengagement and the subsequent rotation of the second coupling element 12 in a counterclockwise direction (with reference to the view in FIGS. 1-3), pin 79 contacts the end surface 77 of stem 73 (the other end 76 of the latter being already in abutment against abutment pin 78-FIG. 3), and there takes place a phase of guided displacement towards the rest position, until, by continuing the rotation about axis 7 (in a clockwise direction with reference to FIGS. 1-3), the distance between the convex surfaces of pins 78 and 79 is greater than the length of stem 73 and first surface 77 and pin 79 disengage, thereafter surface 76 and pin 78. As a consequence of the disengagement of the surfaces of the first pair of mechanical abutting surfaces (77,79), spring 26 causes the closure between rotation elements 9 and 12, that is limited by contact between positive stop element 33 and the surface of block 24.

In the checking condition the cooperation between crankpin 18 and reference device 20 is maintained, as above described, owing to the displacements of the components caused by the force of gravity. The action of spring 21, the stretching of which increases with the lowering of support block 19, partially and dynamically counterbalances the forces due to the inertia of the moving parts of the checking apparatus following the displacements of crankpin 18. In such a way, it is possible, for example, to avoid strong overstresses between the reference device 20 and the crankpin 18, in correspondence to the lower position 18", that might tend to cause deformations of the Vee shape of the reference device 20. On the other side, since during the raising movement of the apparatus (due to rotation of the crankpin towards the upper position 18'), the pulling action of spring 21 decreases, the inertial forces tending, in correspondence to the upper position 18', to release the engagement between the Vee-shaped reference device 20 and the crankpin 18, can be properly counterbalanced. It should be realized that spring 21 does not cause any pressure between reference device 20 and crankpin 18, that mutually cooperate, as above mentioned, just owing to the force of gravity.

The coupling elements 9 and 12 are basically linear arms with geometric axes lying in transversal planes with respect to the axis of rotation 8 of the crankshaft and to the axis of rotation 3 of grinding wheel 4. However, as shown in FIG. 5, wherein there is also partially shown a crankshaft 34, in order to avoid any interferences with elements and devices of the grinding machine, coupling element 12 comprises portions 36 and 37 extending in a longitudinal direction and portions off-set in different transversal planes.

FIGS. 6 and 7 show some details of the measuring device of the apparatus. In FIG. 6 there is shown a crankpin 18 featuring in the central part, as usual, a lubrication hole 38. For the purposes of ensuring the most suitable reciprocal position between the Vee-shaped reference device 20 and the surface of crankpin 18, the guide tubular casing 15 is symmetrically arranged with respect to the intermediate cross-section of crankpin 18. For the purposes of avoiding any interferences with lubrication hole 38, feeler 17 is offset with respect to the intermediate cross-section of pin 18, by means of a transversal portion 40 of transmission rod 16.

The axial displacements of transmission rod 16 with respect to a reference position are detected by means of a measurement transducer, fixed to tubular casing 15, for example a transducer 41 of the LVDT or HBT type (known and herein not illustrated in the figures), with fixed windings and a ferromagnetic core 43 coupled to a movable element, or rod 42, movable with the transmission rod 16. As shown in FIG. 7, too, the axial displacement of the transmission rod 16 is guided by two bushings 44 and 45, arranged between casing 15 and rod 16. A metal bellows 46, that is stiff with respect to torsional forces, and has its ends fixed to rod 16 and to casing 15, respectively, accomplishes the dual function of preventing rod 16 from rotating with respect to casing 15 (thus preventing feeler 17 from undertaking improper positions) and sealing the lower end of casing 15.

The support block 19 is secured to guide casing 15 by means of pairs of screws 50 passing through slots 51 and supports reference device 20, consisting of two elements 52, 53 with sloping surfaces, whereto there are secured two bars 54, 55. The rest position of feeler 17 can be adjusted by means of screws 50 and slots 51.

It is possible to equip one of the above described checking apparatuses with further feelers, associated transmission rods and measurement transducers for detecting further diameters and other dimensions and/or geometrical or shape characteristics of the crankpin being machined.

The Vee-shaped reference device 20 can be replaced with reference devices of a different type.

It is obvious that in a multiwheel grinding machine simultaneously machining a plurality of crankpins there can be foreseen just as many checking apparatuses. Furthermore there can be foreseen other manufacturing variants in checking apparatuses according to the invention, e.g. as far as the structure of the limiting device is concerned, that can include, for example, an elongate element hinged to support element 5 (or to the second coupling element 12), constrained to perform limited rotations with respect to the first coupling element 9, and provided with a free end for achieving a mechanical abutting surface with a suitable element integral with the second coupling element 12 (or to support element 5) for causing the changing from the first to the second phase in the displacement of the apparatus, as previously described, and guide the displacement of the reference device in said second phase.

Other possible embodiments of guide means in a checking apparatus according to the invention include limiting devices with at least two mechanical reference abutment elements that, in the course of the apparatus displacement from the rest position to the checking condition, cooperate together for limiting and guiding the displacement of the reference device (20), but do not interfere with the displacements of the coupling elements (9 and 12) in the course of the crankpin checking phase.

Other possible variants can involve the structure and the arrangement of the control device and/or of the balance spring 21. As an example, spring 21 can be replaced with a compression or traction spring properly arranged between the mutually rotating parts of the apparatus, or can be removed. In the latter case, the features of compression spring 67 (in the limiting device 70) can be properly selected in order to perform the couterbalancing action. In fact, in the checking condition, while abutting surface 77 and pin 79 are disengaged, surface 76 is kept in abutment against pin 78 by spring 67. As a consequence, during the checking operation, spring 67 applies a thrust between the support element 5 (through pin 78 and stem 73) and the first coupling element 9 (through the tubular element 71). The thrust applied by compression spring 67 opposes to the action of the forces of gravity, and varies during the movements of the reference device 20, dynamically counterbalancing part of the forces due to the inertia of the moving parts of the apparatus, as explained above with reference to spring 21.

Furthermore, there can be foreseen an additional guide element coupled to reference device 20, achieved, for example, as disclosed in U.S. Pat. No. 6,067,721.

An apparatus according to the invention, even though particularly suitable for the checking of crankpins in orbital motion, can obviously be generally utilized for checking a cylindrical part rotating about its axis, or about an axis parallel to its axis.

What is claimed:

1. An apparatus for checking diametral dimensions of a crankpin orbitally rotating about a geometrical axis, in the course of the machining of a crankshaft including said crankpin in a numerical control grinding machine including a grinding-wheel slide carrying a grinding-wheel, the apparatus comprising:
   a Vee-shaped reference device carrying a measuring device and adapted to keep contact with the crankpin to be checked, in a checking condition, substantially owing to the forces of gravity;
   a support device, fixed to the grinding-wheel slide, for movably supporting the Vee-shaped reference device, the support device comprising at least one rotatable coupling element carrying said Vee-shaped reference device; and
   a guiding mechanism, with mutually sliding guiding surfaces, adapted for guiding movements of the Vee-shaped reference device from a rest position towards said checking condition and vice-versa.

2. An apparatus according to claim 1, wherein said guiding mechanism includes at least one pair of abutting surfaces adapted to be in contact with each other when guiding said movements of the Vee-shaped reference device, and disengaged from each other in said checking condition.

3. An apparatus according to claim 2, wherein the abutting surfaces of said at least one pair are adapted to be disengaged from each other in said rest position.

4. An apparatus according to claim 1, further including a control device for controlling automatic displacements of the apparatus from said rest position to said checking condition and vice-versa.

5. An apparatus according to claim 1, wherein said support device is fixed to the grinding-wheel slide.

* * * * *